United States Patent
Prendergast (10) Patent No.: US 12,039,392 B2
(45) Date of Patent: Jul. 16, 2024

(54) LOCATION OF FASTENER ACCESSORY USING SACRIFICIAL RF TAG

(71) Applicant: The Boeing Company, Chicago, IL (US)

(72) Inventor: Matthew L. Prendergast, Covington, WA (US)

(73) Assignee: The Boeing Company, Chicago, IL (US)

(*) Notice: Subject to any disclaimer, the term of this patent is extended or adjusted under 35 U.S.C. 154(b) by 256 days.

(21) Appl. No.: 17/468,876

(22) Filed: Sep. 8, 2021

(65) Prior Publication Data
US 2022/0230041 A1 Jul. 21, 2022

Related U.S. Application Data

(60) Provisional application No. 63/138,027, filed on Jan. 15, 2021.

(51) Int. Cl.
*G06K 19/07* (2006.01)
*G06K 19/077* (2006.01)
*H01Q 1/22* (2006.01)
*H01Q 3/22* (2006.01)

(52) U.S. Cl.
CPC . *G06K 19/07773* (2013.01); *G06K 19/07758* (2013.01); *H01Q 1/2283* (2013.01); *H01Q 3/22* (2013.01)

(58) Field of Classification Search
CPC ....... G06K 19/07773; G06K 19/07758; G06K 19/07786; G06K 19/07798; H01Q 1/2283; H01Q 3/22; H01Q 1/38; H01Q 1/2225
USPC .......................................................... 340/10.3
See application file for complete search history.

(56) References Cited

U.S. PATENT DOCUMENTS

| | | | |
|---|---|---|---|
| 8,390,479 B2 * | 3/2013 | Wilby | B64C 25/26 340/960 |
| 2009/0212954 A1 * | 8/2009 | Adstedt | B65D 41/00 340/572.7 |
| 2019/0332913 A1 * | 10/2019 | Onuki | G06K 19/027 |
| 2021/0354378 A1 * | 11/2021 | Truong | B29C 64/176 |

* cited by examiner

Primary Examiner — Omar Casillashernandez
(74) Attorney, Agent, or Firm — Quinn IP Law (57) ABSTRACT

A fastener accessory includes a fastener body and a sacrificial radio frequency (RF) tag. A dielectric substrate of the tag is affixed to a contact surface of the fastener body. An RF antenna trace is connected to or printed on the substrate. The antenna trace transmits an RF response signal when energized by an external RF tracking circuit. The substrate is plastically deformed by an installation force to prevent transmission of the response signal. A method for locating the fastener body within a search area includes exciting a receiver trace of the tag using an interrogation signal, frequency-modulating an interrogation frequency using an RF modulating circuit, transmitting a response signal at a response frequency via a transmitting antenna trace of the tag, and detecting the response signal using an RF tracking circuit to locate the fastener body within the search area.

10 Claims, 7 Drawing Sheets

LOCATION OF FASTENER ACCESSORY USING SACRIFICIAL RF TAG

CROSS-REFERENCE TO RELATED APPLICATIONS

This application claims the benefit of priority to U.S. Provisional Application No. 63/138,027 filed on Jan. 15, 2021, which is hereby incorporated by reference in its entirety.

INTRODUCTION

Modern aircraft, spacecraft, and other complex mobile and stationary systems are constructed of a vast number of component parts. For instance, a modern jet-powered passenger airplane uses several million different parts in its construction. Many of the parts are interconnected using specialized or off-the-shelf fastener hardware such as screws, bolts, nuts, washer, rivets, and river stems, as well as cable tie-downs, electrical clips, end connectors, and the like. The myriad of different sizes, shapes, and materials of construction in the vast array of fastener hardware can complicate manufacturing and assembly processes. This is particularly true when relatively small and difficult to handle fasteners are inadvertently dropped or misplaced and thus lost within a workspace.

An example scenario is that of assembling, overhauling, or repairing a modern aircraft or other complex system. In such a scenario, maintenance personnel are often required to work within or in proximity to confined workspaces. Space restrictions and the small size of many of the above-noted fasteners often results in lost fasteners. In a typical aircraft passenger cabin or fuselage interior, for instance, a fastener could make its way through openings in the floor or between adjacent ribs of the fuselage, behind a control panel, or into another undesirable space. Over time, the lost fastener could cause adjacent components to wear or short out, thus leading to a condition referred to in the art as Foreign Object Damage/FOD.

SUMMARY

The present disclosure provides a solution to the above-noted problem of Foreign Object Damage (FOD) during a manufacturing process. While the particular manufactured end product may vary within the scope of the present disclosure and appended claims, the present teachings are of particular benefit in reducing instances of FOD during the manufacturing and assembly of aircraft, spacecraft, and other vehicles, as well as other stationary or mobile systems in which the risk of FOD is elevated due to the use of easily dropped, misplaced, or otherwise lost fastener hardware in proximity to damage-sensitive components or subsystems.

In particular, the solutions presented herein involve the use of low-cost sacrificial radio frequency (RF) tags in conjunction with mechanical or electrical fastener bodies for the purpose of enabling remote detection of the fastener body, thereby reducing instances of the above-described FOD. The disclosed solutions may also be used in any manufacturing environment in which FOD is a concern, and in which determining a resting location of an inadvertently dropped or misplaced fastener body would be desirable.

In an exemplary embodiment, a fastener accessory as described herein includes a fastener body and a sacrificial RF tag. The fastener body includes a contact surface configured to receive an installation force during connection of the fastener body to a component. The sacrificial RF tag includes a dielectric substrate affixed to the contact surface, as well as an RF antenna trace connected to or imprinted on the dielectric substrate. The sacrificial RF tag transmits an RF response signal when the RF antenna trace is excited by an external exciter/RF tracking circuit. The installation force is configured to plastically deform or destroy the sacrificial RF tag to prevent transmission of the RF response signal, and thus the RF tag communicates with the RF tracking circuit solely in pre-installation use scenarios.

The RF antenna trace contemplated herein may optionally include separate receiver (Rx) and transmitter (Tx) antenna traces positioned on or within the dielectric substrate. In such a configuration, the Tx antenna trace is spaced a distance apart from the Rx antenna trace on or within the dielectric substrate. An RF modulating circuit interconnects the Rx and Tx antenna traces. The sacrificial RF tag is configured to transmit the RF response signal at a predetermined response frequency via the Tx antenna trace when the Rx antenna trace is excited by an RF interrogation signal from the external RF tracking circuit noted above.

In some embodiments, the RF modulating circuit includes a fixed-value receiver. Alternatively, the RF modulating circuit may include a system-on-a-chip (SoC) configured to actively frequency-modulate a frequency of the RF interrogation signal to thereby generate the predetermined response frequency. Representative embodiments are described in which the RF interrogation signal is on the order of about 10 MHz, while the predetermined response frequency is on the order of 100 MHz, i.e., about 10 times the frequency of the RF interrogation signal. Other embodiments may exist at other frequencies, provided the response frequency is readily distinguishable from the interrogation frequency, thus enabling detection in accordance with the disclosed solutions.

The fastener body in some configurations includes an externally-threaded shaft and a fastener head integrally connected thereto at or along an underside of the fastener head. The contact surface in such an embodiment includes the underside of the fastener head.

Alternatively, the fastener body may be an internally-threaded nut configured to surround and engage an externally-threaded shaft during installation, with the contact surface in such an embodiment including a surface of the internally-threaded nut.

The dielectric substrate in some aspects of the present disclosure is constructed from a flexible polymer film.

The Rx and Tx antenna traces may each be laser-etched, printed, or micro-imprinted directly onto the dielectric substrate in some embodiments, and/or the Rx and Tx traces may be integrated together as described herein.

The RF tag may be non-serialized, such that the RF tag does not transmit data as part of its RF response signal.

Also disclosed herein is a method for locating a fastener body within a search area. The method according to a possible embodiment includes attaching a dielectric substrate of a sacrificial RF tag to a contact surface of the fastener body, the RF tag including an Rx antenna trace positioned on or within the dielectric substrate, a Tx antenna trace spaced apart from the Rx antenna trace on or within the dielectric substrate, and an RF modulating circuit interconnecting the Rx antenna trace and the Tx antenna trace. The method includes exciting the Rx receiver trace at an interrogation frequency using an RF interrogation signal, and then frequency-modulating the interrogation frequency using the RF modulating circuit.

The method also includes transmitting an RF response signal at a predetermined response frequency via the Tx antenna trace. The RF response signal is then detected as part of the method using the RF tracking circuit to thereby locate the fastener body within the search area.

Another embodiment of the present method for locating a fastener body within a search area includes adhering a sacrificial RF tag to the fastener body using a dielectric adhesive material, with the sacrificial RF tag containing an antenna array. Within the search area, the method includes exciting an Rx antenna trace of the antenna array after adhering the sacrificial RF tag to the fastener body, including directing a calibrated RF interrogation signal with a predetermined interrogation frequency from an RF tracking circuit into the search area.

After exciting the Rx antenna trace, the method in this particular embodiment includes receiving an RF response signal having a predetermined response frequency. The RF response signal is received from a Tx antenna trace of the antenna array using the RF tracking circuit, with the predetermined response frequency being higher than the predetermined excitation/interrogation frequency, e.g., by a factor of 10× in some embodiments. The method thereafter includes using the RF response signal to locate the fastener body within the search area, with the RF response signal in this embodiment also being characterized by an absence of data.

The method may, in some approaches, include installing the fastener body to a component of an aircraft or a spacecraft by applying an installation force to the fastener body. The installation force plastically deforms the sacrificial RF tag to a level sufficient for preventing further transmission of the RF response signal.

Adhering the sacrificial RF tag to the fastener body using the dielectric adhesive material may include loading a stack of the sacrificial RF tags onto a clamping tool having an anvil and spring-biased arms or handles, and manually clamping the sacrificial RF tag from the stack of the sacrificial RF tags directly onto the fastener body using forces imparted by the clamping tool.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Figure 1:
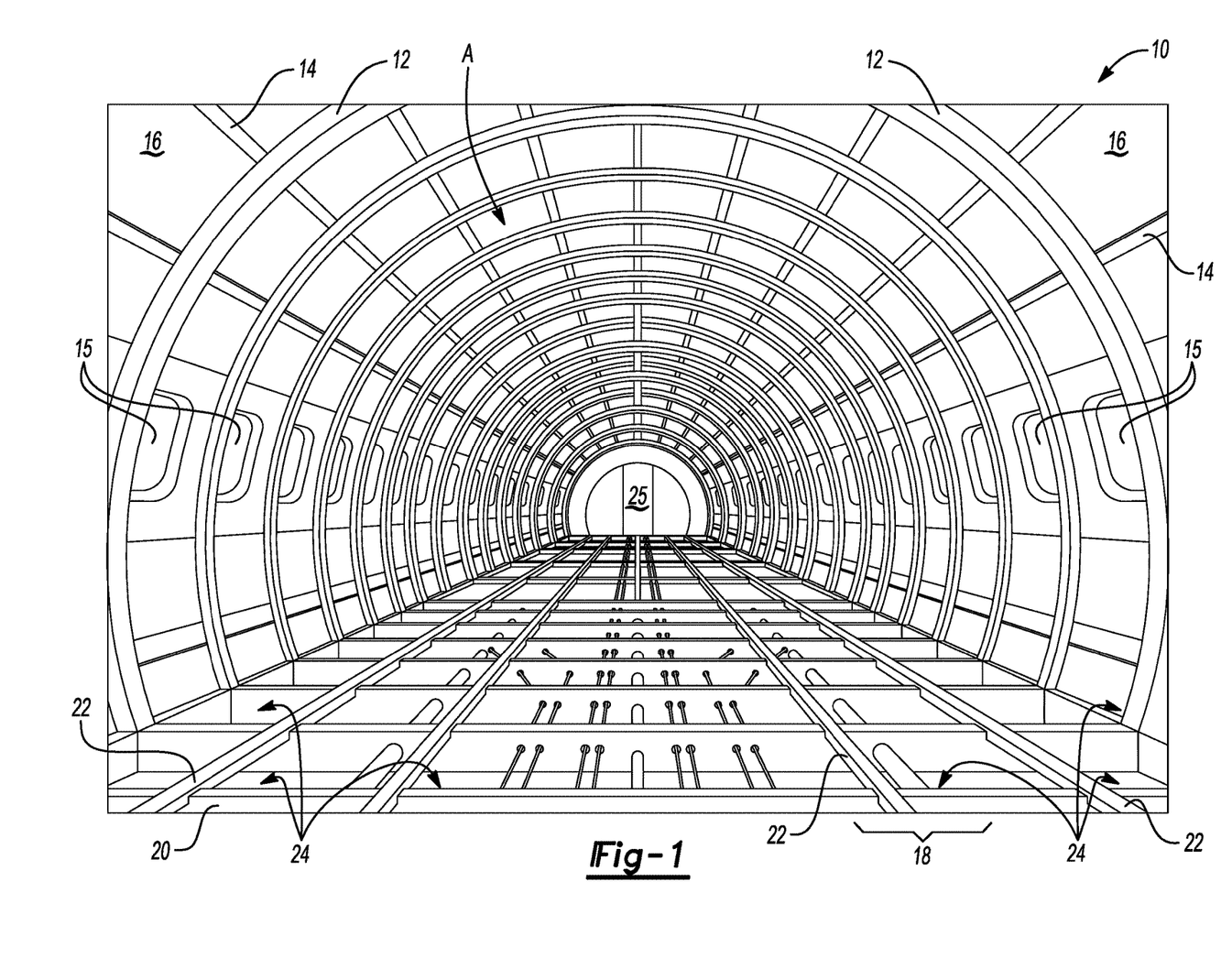
FIG. 1 is a schematic illustration of a representative workspace in the form of an aircraft fuselage interior in which a lost fastener body could present a foreign object damage (FOD) risk of the type mitigated by the solutions presented herein.

Referring to the drawings, wherein like reference numbers refer to the same or like components in the several Figures, a workspace 10 is shown in FIG. 1. The workspace 10 is depicted in a non-limiting exemplary embodiment as an aircraft fuselage interior or passenger cabin as it might appear during manufacturing, or in the course of an extended maintenance overhaul. In such a state, the workspace 10 is devoid of interior wall panels, seats, and flooring, which in turn exposes transverse ribs 12 and longitudinal beams 14. An external fuselage skin 16 defining window openings 15 is thus visible between the transverse ribs 12 and the longitudinal beams 14. Other workspaces 10 may be envisioned, such as interiors or exteriors of spacecraft, surface and subsurface marine vessels and watercraft, robotics, industrial equipment, etc., and therefore the depicted scenario of FIG. 1 is just one possible embodiment of the workspace 10 within the scope of the present disclosure and the appended claims.

Floor supports 18 are present within a cavity (arrow A) of the workspace 10, which in the representative embodiment of FIG. 1 is surrounded by the above-noted transverse ribs 12, longitudinal beams 14, and fuselage skin 16. The floor supports 18 may include transverse and longitudinal joists 20 and 22, respectively. When a floor surface is eventually installed along with seat pallets, passenger seats, and other equipment, the interconnected floor supports 18 support and distribute the collective weight via the joists 20 and 22.

Prior to installation of these and other components, however, the interconnected joists 20 and 22, the transverse ribs 12, the longitudinal beams 14, and possibly other structural components within the workspace 10 may define openings 24 of various sizes therebetween. Workspaces 10 other than the representative aircraft embodiment depicted in FIG. 1 may be envisioned in which similar openings 24 are present. When working within the workspace 10, and in particular when transporting, handling, or installing fastening hardware for connection to a component, opportunities abound for inadvertently dropping and losing such hardware. The final resting locations of such dropped or misplaced hardware complicates location and removal thereof, often leading to time consuming and often fruitless searches of the workspace 10.

As noted above, a lost or misplaced fastener such as a screw, bolt, nut, washer, or rivet poses a short-term or long-term risk of foreign object damage (FOD). This is particularly true in an aviation or aerospace content. For instance, although omitted for illustrative simplicity, the representative workspace 10 of FIG. 1 may include one or more additional levels located below that of the floor supports 18. In the non-limiting exemplary aircraft manufacturing or overhaul scenario depicted in FIG. 1, such a level may include a cargo bay and an equipment bay, with the identity of the lower bay depending on the particular location along the floor supports 18 relative to a bulkhead 25 disposed at a distal end of the workspace 10.

In addition to housing cargo, an aircraft cargo bay may also contain emergency oxygen supplies, compressors, cooling systems, and potable water. One or more separate equipment bays may include electrical and hydraulic flight control equipment such as electrical distribution panels, circuit breakers, wiring, battery compartments, weather radar, flight and onboard systems control equipment, and the like. Any or all of these important systems may experience FOD as they are degraded or damaged over time due to abrasion, interference, or contact with a lost fastener of the types considered herein. The present radio-frequency (RF)-based location and tracking solutions therefore address this particular problem, with various embodiments now discussed with reference to FIGS. 2-12.

Figure 2:
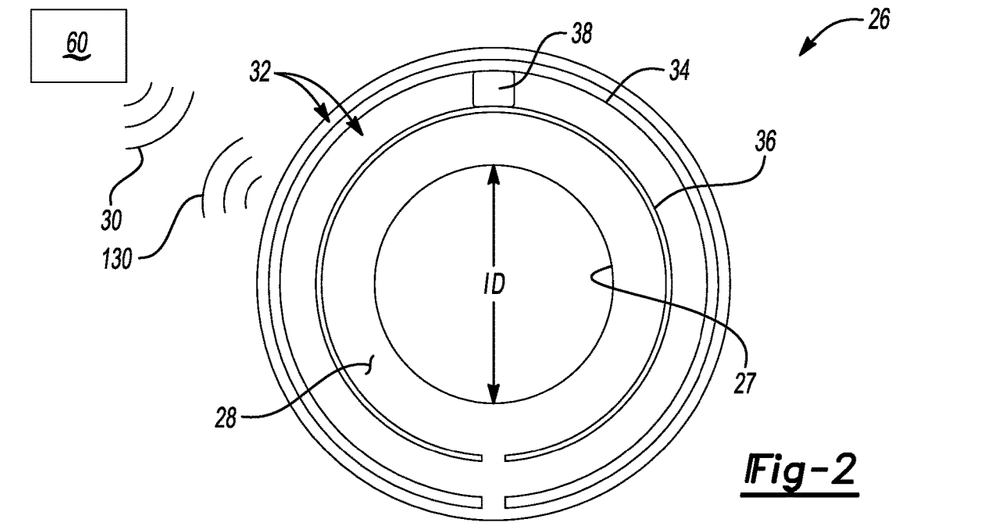
FIG. 2 is a schematic plan view illustration of an exemplary sacrificial radio frequency (RF) tag usable as part of a fastener accessory within the scope of the present disclosure.
Figure 5:
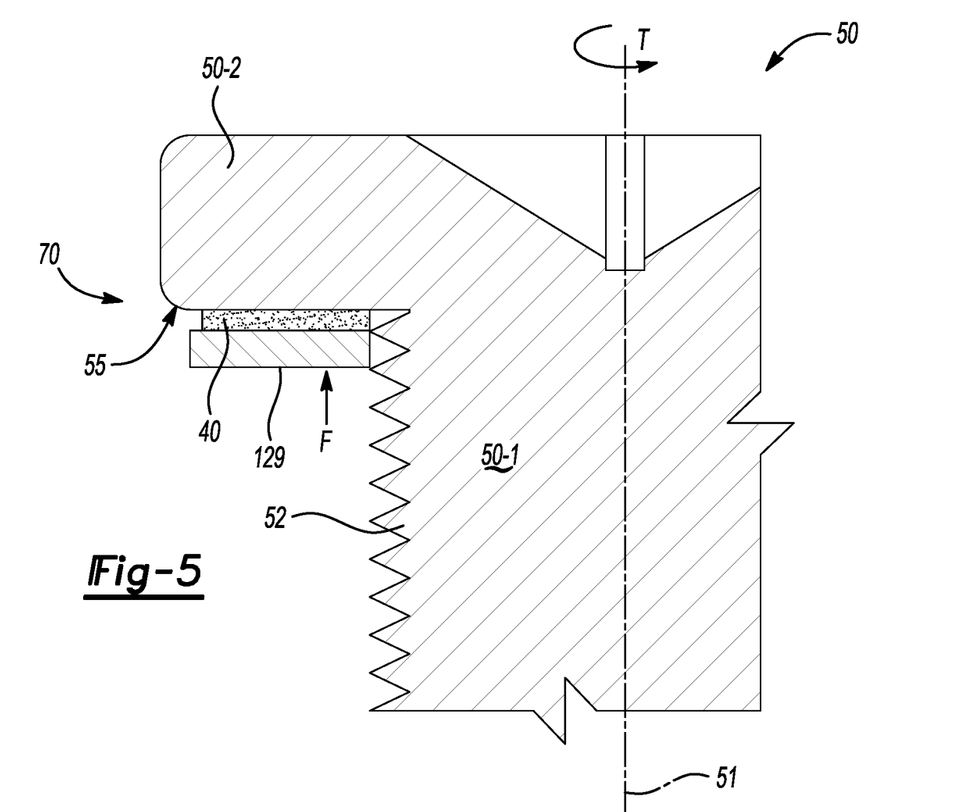
FIG. 5 is a schematic partial cross-sectional perspective view illustration of a fastener accessory having an externally-threaded fastener shaft and integral fastener head according to an exemplary embodiment.

Referring to FIG. 2, the above-noted fastener, or more specifically a fastener body 50 thereof as shown in an exemplary embodiment in FIG. 5, is equipped herein with a sacrificial radio frequency (RF) tag 26. In the ring-shaped or annular configuration of FIG. 2 which the RF tag 26 includes a circular inner circumferential wall 27, an inner diameter (ID) of the RF tag 26 may receive an externally-threaded shaft 50-1 of the fastener body 50 therein, with the externally-threaded shaft 50-1 likewise shown in FIG. 5. When the RF tag 26 is remotely interrogated and thereby excited by an RF interrogation signal 30 transmitted at a first frequency, e.g., from an external exciter/RF tracking circuit 60 as shown in detail in FIG. 10, the sacrificial RF tag 26 responds with a RF response signal 130 at a predetermined second frequency. The RF response signal 130 thus provides a unique signature that can be detected by the RF tracking circuit 60 for the purpose of locating the fastener body 50 to within an application-suitable level of accuracy.

The sacrificial RF tag 26 as described herein is "sacrificial" in the sense that installation forces applied to the fastener body 50 of FIG. 5 or other embodiments thereof plastically deform or totally destroy the sacrificial RF tag 26, which in turn prevents transmission of the RF response signal 130 after installation. The sacrificial RF tag 26 thus communicates with the RF tracking circuit 60 only when in a pre-installed state. That is, once a fastener body 50 equipped with the sacrificial RF tag 26 is fully installed, the equipped fastener body 50 is no longer detectable, thereby eliminating false location alarms and possible electromagnetic interference by the sacrificial RF tag 26 with other equipment.

In the illustrated construction of FIG. 2, the sacrificial RF tag 26 includes a dielectric substrate 28 and an RF antenna trace 32, the latter of which is connected to or imprinted on the dielectric substrate 28, e.g., via laser etching, surface printing, or micro-imprinting in different embodiments. The RF antenna trace 32 in the illustrated embodiment includes a receiver (Rx) antenna trace 34 and a transmitter (Tx) antenna trace 36. The Tx antenna trace 36 is spaced apart from the Rx antenna trace 34 on or within the dielectric substrate 28.

As part of the illustrated embodiment of FIG. 2, an RF modulating circuit 38 interconnects the Rx antenna trace 34 and the Tx antenna trace 36. In this particular configuration, the sacrificial RF tag 26 is configured to transmit the RF response signal 130 at the above-noted predetermined response frequency, via the Tx antenna trace 36, whenever the Rx antenna trace 34 is excited by the RF interrogation signal 30 from the RF tracking circuit 60. Other configurations may be envisioned for constructing the RF antenna 32. For example, a modulated pulse tone may be applied to a single fixed antenna to incite a unique frequency response, as appreciated in the art.

With respect to the particular embodiment of FIG. 2, the RF modulating circuit 38 may be optionally embodied as a fixed-value receiver, or as a combination resistor, inductor, and/or capacitor to produce a desired modulation to the received RF interrogation signal 30. Other embodiments may be envisioned in which the RF modulating circuit 38 is a system-on-a-chip (SoC) or an application-specific integrated circuit (ASIC) configured to actively frequency-modulate the frequency of the RF interrogation signal 30 to thereby generate the RF response signal 130 having a predetermined response frequency.

In general, search and location may proceed by transmitting a fixed frequency from the RF tracking circuit 60, e.g., 10 MHz, which is then received by the RF tag 26. The sacrificial RF tag 26 converts the received RF energy to DC power to power transmission of the RF response signal 130 at a different frequency, e.g., 100 MHz. The higher frequency signal is then detected using a handheld RF tracker such as the non-limiting RF tracking circuit 60 as described in detail below with reference to FIG. 10.

Figure 3:
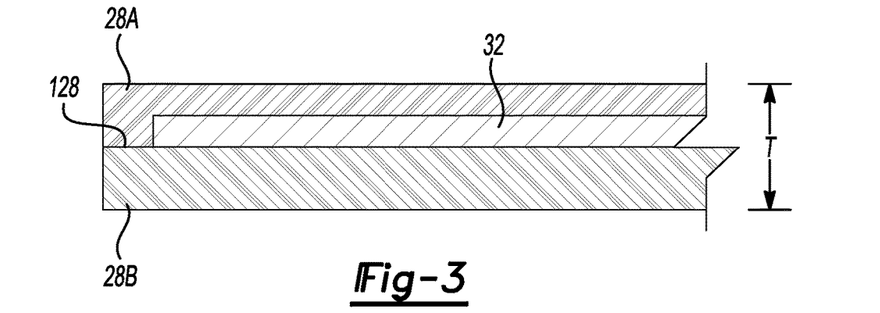
FIG. 3 is a schematic partial cross-sectional side view illustration of a portion of the RF tag shown in FIG. 2.

As depicted schematically in FIG. 3, the sacrificial RF tag 26 is constructed from relatively low-cost, one-time use materials in which the RF antenna 32 is formed in or etched or printed on a surface 128 of the above-noted dielectric substrate 28, e.g., between layers 28A and 28B thereof. The sacrificial RF tag 26 may be constructed from a thin, flexible dielectric polymer film of a thickness T, e.g., on the order of less than 1 mm. When attached as set forth below, therefore, the thin profile and flexible materials are easily plastically deformed or completely destroyed by an applied torque or other installation forces.

In contrast to conventional RFID tags, the sacrificial RF tag 26 contemplated herein and shown in FIG. 2 is not serialized, i.e., the sacrificial RF tag 26 does not transmit data or information as part of a programmed function. Its functions are instead limited in the described embodiments to transmission of the RF response signal 130 as a waveform having a uniquely identifiable response frequency relative to the frequency of the incident RF interrogation signal 30.

In terms of the above-noted one-time use, installation-based destruction of the sacrificial RF tag 26 prevents undesirable post-installation transmission of the RF response signal 130 of FIG. 2. In this way, the RF tracking circuit 60 of FIGS. 2 and 10 may be maneuvered by an operator within a space in which a lost or dropped fastener is likely to have fallen. The strength of the RF response signal 130 is then used to locate the fastener body 50 to a reasonable degree of accuracy within such a space. Roughly speaking, location to within 10 feet of the fastener body 50 may be sufficient, with the operator thereafter manually conducting the search. Other embodiments may be constructed in which the accuracy is much higher, e.g., to within 1 foot of the actual location. As properly installed fasteners cannot respond to the RF interrogation signal 30, false alarms are effectively eliminated, with any received RF response signal 130 likely belonging to the lost fastener.

Figure 4A:
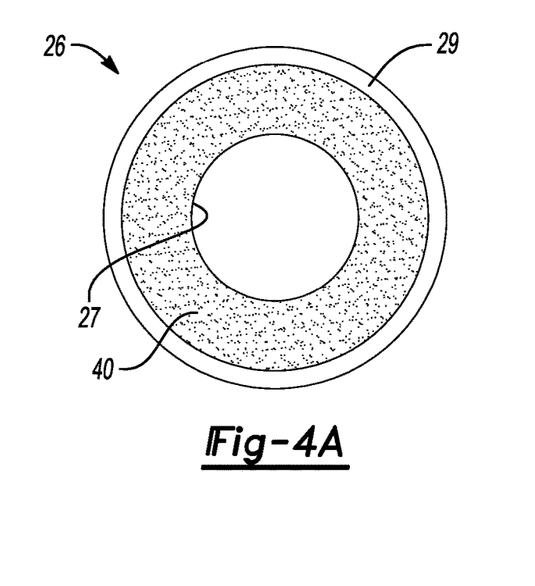
FIGS. 4A and 4B are schematic plan view illustrations of opposing surfaces of the sacrificial RF tag depicted in FIG. 2.
Figure 4B:
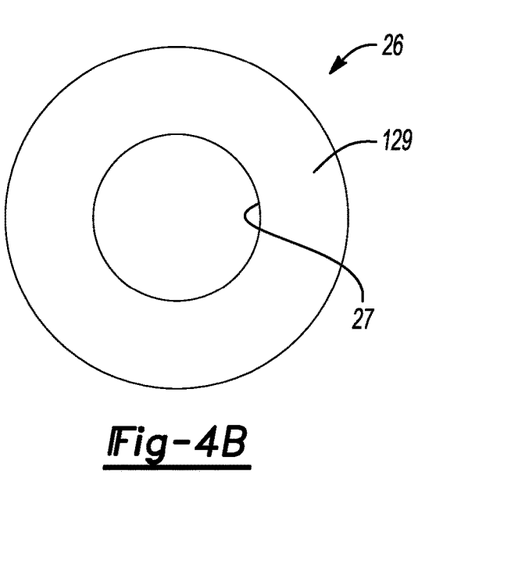

As shown in FIGS. 4A and 4B, the sacrificial RF tag 26 of FIGS. 2 and 3 in the depicted annular embodiment has primary surface 29 on which is applied a layer of a suitable dielectric adhesive material 40. Specialty electrically-insulative two-part epoxies, silicones, or other quick-set suitable polymer materials may be used for this purpose. A primary surface 129 diametrically opposite to the surface 29 is characterized by a lack of the adhesive material 40, with surface 129 treated with materials or constructed of a particular material to which the adhesive material 40 will not adhere. Such a construction would facilitate the application variation described below with reference to FIGS. 11 and 12.

Referring now to FIG. 5, the above-described sacrificial RF tag 26 is adhesively attached to a contact surface 55 of the fastener body 50 to form a fastener accessory 70. In a representative embodiment, the fastener body 50 may be a screw or bolt having a centerline 51, the externally-threaded shaft 50-1, and an integral fastener head 50-2. In this configuration, external threads 52 of the externally-threaded shaft 50-1 are adjacent to the inner circumferential surface 27 (FIGS. 4A and 4B) of the sacrificial RF tag 26 once the sacrificial RF tag 26 is securely adhered to the contact surface 55, with the contact surface 55 in this instance being an underside of the fastener head 50-2.

For example, a screwdriver or torque wrench may be applied to the fastener head 50-2 to deliver a torque (arrow T) about the centerline 51. This ultimately results in linear and rotational installation forces (arrow F) being directed to primary surface 129 once primary surface 129 contacts an external component (not shown in FIG. 5), e.g., a surface of a fuselage panel or a control board in the representative aviation embodiment of FIG. 1. Due to such installation forces (arrow F), the sacrificial RF tag 26 is ultimately twisted and crushed during installation of the fastener body 50, thereby causing plastic deformation and destruction of the sacrificial RF tag 26 attached thereto.

Figure 6:
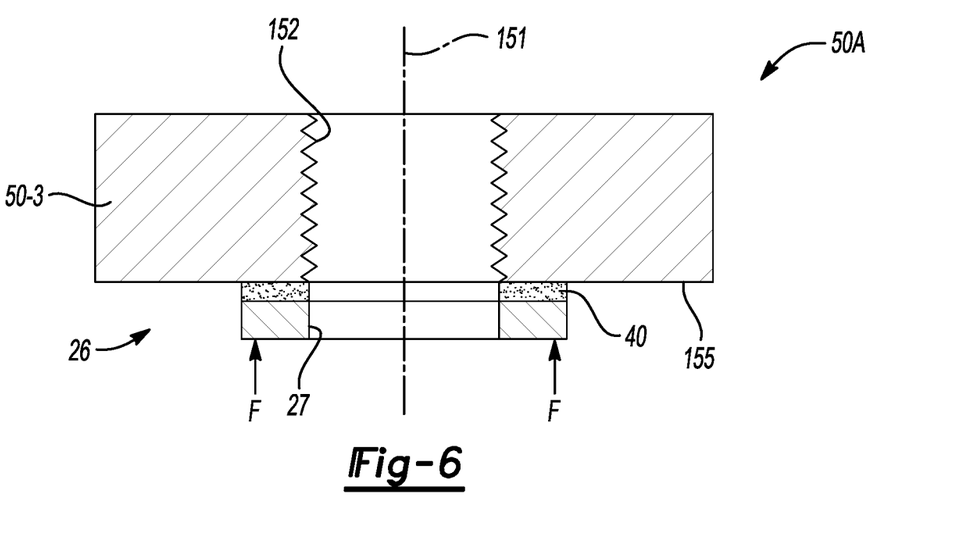
FIG. 6 is a schematic cross-sectional perspective view illustration of a fastener accessory in the form of an internally-threaded nut according to another exemplary embodiment.

The scope of the present disclosure may be extended to other fastener types. For example, and as shown in FIG. 6, a fastener body 50A with an attached sacrificial RF tag 26 forms another fastener accessory 70A. The fastener body 50A is in the form of an internally-threaded nut 50-3 or, in other embodiments, an unthreaded planar washer, and includes a contact surface 155. In a possible configuration, the sacrificial RF tag 26 may be adhered to the contact surface 155 as shown. An externally-threaded fastener body 50 such as shown in FIG. 5 may be inserted along a centerline 151. Once the nut 50-3 is tightened against the fastener head 50-2, the installation forces (arrows F) likewise deform/destroy the installed sacrificial RF tag 26.

Figure 9:
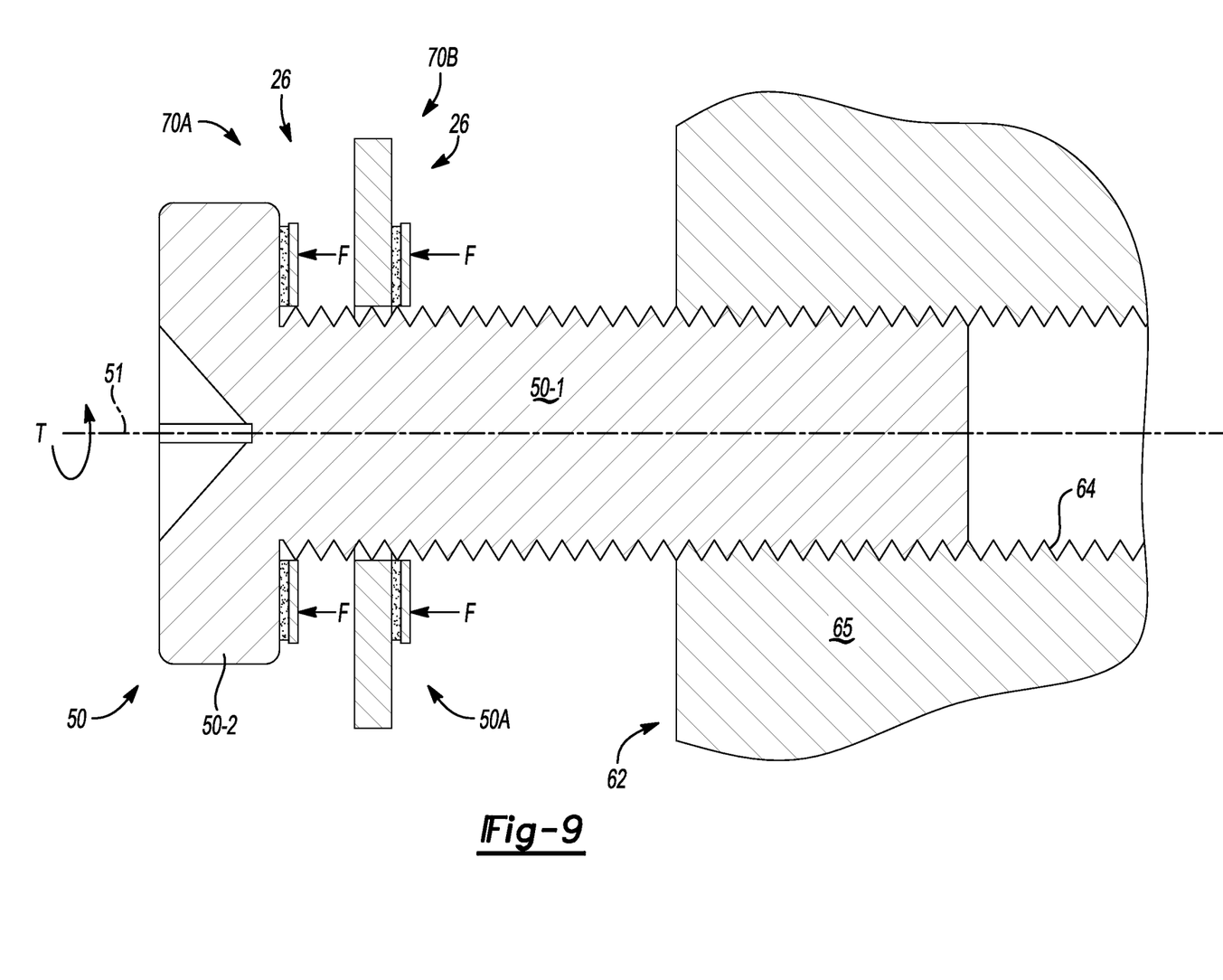
FIG. 9 is a schematic cross-sectional side view illustration of a fastener accessory during installation to a component.

Referring briefly to FIG. 9, the embodiments of FIGS. 5 and 6 may be combined in some configurations. That is, an alternative fastener accessory 70B may include the above-noted externally-threaded fastener body 50 of FIG. 5 and the nut or washer-type fastener bodies 50A of FIG. 6. During a representative installation process, the externally-threaded shaft 50-1 of the fastener body 50 is threaded into an internally-threaded opening 64 of a component 65 along the centerline 51 using the applied torque (arrow T). Once the contact surface 155 of the fastener body 50A is in close proximity to a surface 62 of the component 65, continued application of the torque (arrow T) transmits the installation forces (arrows F) to the installed sacrificial RF tag 26 located on the fastener body 50A. Soon thereafter, the installation forces (arrows F) are transferred to the contact surface 55 of the fastener head 50-2. Both installed sacrificial RF tags 26 are thereby twisted, torn, crushed, and otherwise plastically deformed/destroyed as the fastener body 50A is tightened against the surface 62.

Figure 7:
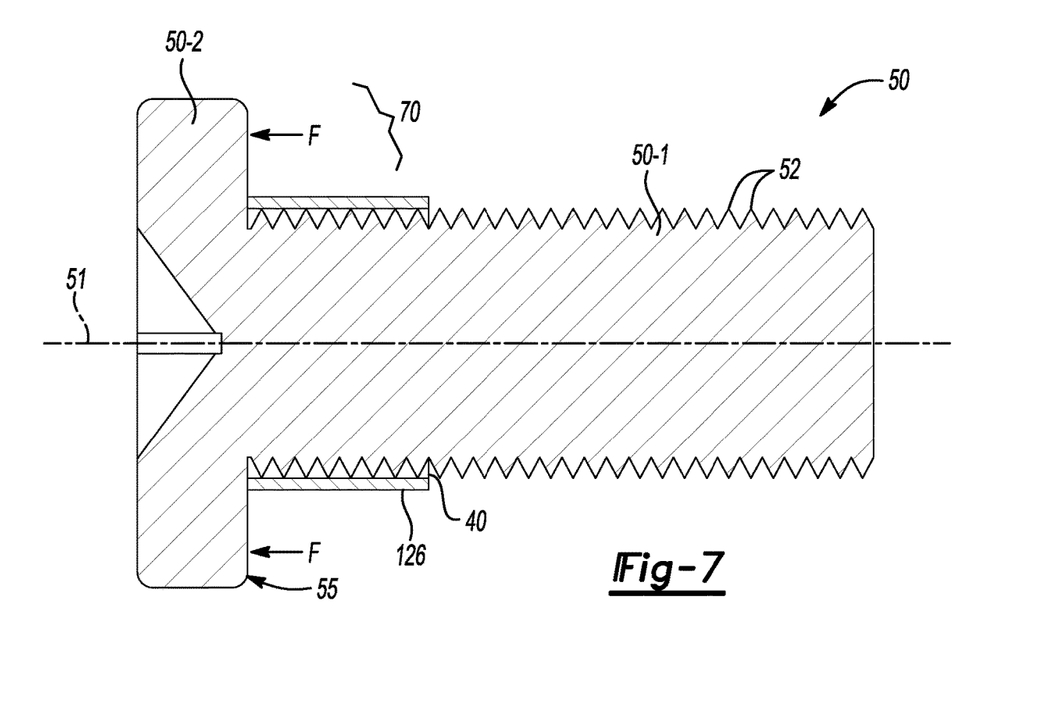
FIG. 7 is schematic cross-sectional perspective view illustration of a fastener accessory according to yet another exemplary embodiment.
Figure 8:
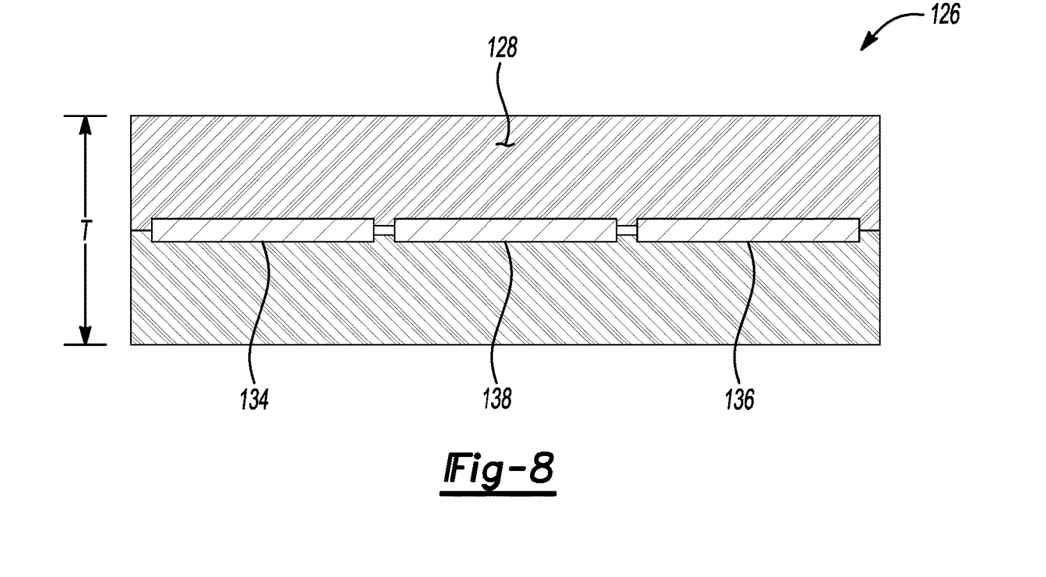
FIG. 8 is a schematic cross-sectional side view illustration of the RF tag shown in FIG. 7.

Yet another possible configuration is shown in FIGS. 7 and 8. Here, the alternatively configured sacrificial RF tag 126 of FIG. 8, inclusive of an Rx antenna trace 134, a Tx antenna trace 136, and an RF modulating circuit 138 disposed in/on dielectric substrate 28 of a thickness T may be adhered using the adhesive material 40 to the externally-threaded shaft 50-1 in proximity to the contact surface 55, e.g., on the underside of the integral fastener head 50-2, thus functioning in the manner of a sleeve. Installation forces (arrows F) on the contact surface 55, along with threaded contact between the threads and mating threads (not shown) of the component and/or the nut of FIG. 6, ultimately crush and twist the installed sacrificial RF tag 126 to the same desired destruction effect.

Figure 10:
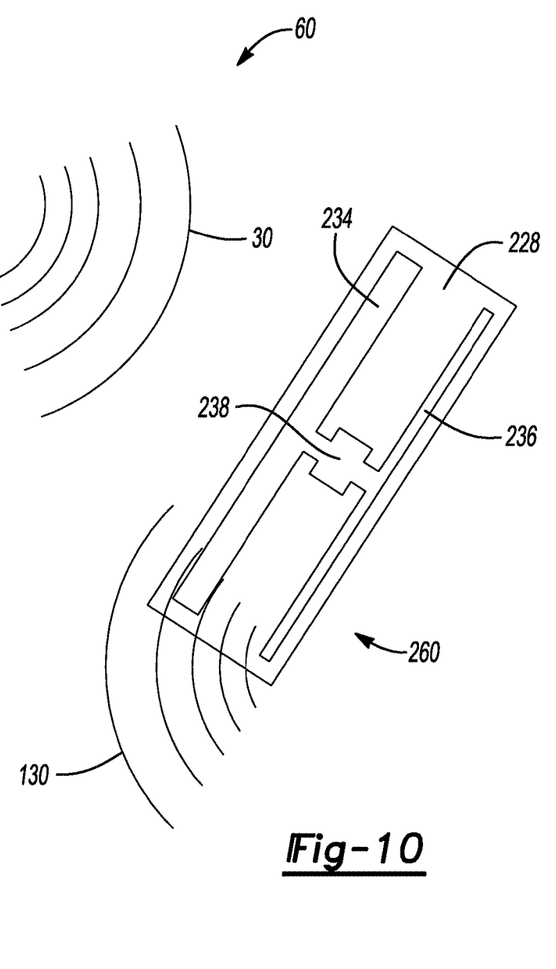
FIG. 10 is a schematic circuit diagram of an external exciter/RF tracking circuit usable for locating a fastener accessory configured as described herein.

Referring now to FIG. 10, the external RF tracking circuit 60 noted briefly above is used as part of a method for locating the fastener body 50 or its other described embodiments within a search area, e.g., within a general location in which a lost or inadvertently dropped fastener body 50 is expected to have come to rest. For illustrative simplicity, the following description is taken with respect to a generic embodiment of the sacrificial RF tag 260 having an Rx antenna trace 234, a Tx antenna trace 236, and an RF modulating circuit 238 connected therebetween, all of which are situated on a dielectric substrate 228.

An initial part of such a method includes attaching the dielectric substrate 228 to the contact surface 55 of the fastener body 50, a process that could be performed manually in a piece-by-piece manner. Such a process could include peeling a backing material (not shown) away from the adhesive material 40 of FIG. 4A to expose the dielectric adhesive material 40, for instance, and then adhering the dielectric substrate 228 to the contact surface 55. Alternatively, the attachment process could be facilitated using a handheld clamping tool such as the representative clamping tool 90 of FIG. 12 described below.

With respect to the RF tracking circuit 60 shown in FIG. 10, such a device may include an RF exciter antenna 87 connected to a fixed RF exciter circuit 82, itself energized via a low-voltage power supply 83, e.g., a 5V battery. An RF receiver antenna directional array 86 may be connected to a fixed RF receiver circuit 84, the latter possibly including a directional visual LED system 85. Using such a setup, the directional array 86 provides sufficient detection bandwidth for which to detect the RF response signal 130 in the event the sacrificial RF tag 260 is excited by the RF interrogation signal 30 emitted by the RF tracking circuit 60. Variation in signal strength of the received RF response signal 130 would produce a different drive voltage to the LED system 85, thereby providing intuitive/visual feedback to the operator of the RF tracking circuit 60 as to proximity of the lost fastener accessory 70 with its attached sacrificial RF tag 26.

Figure 11:
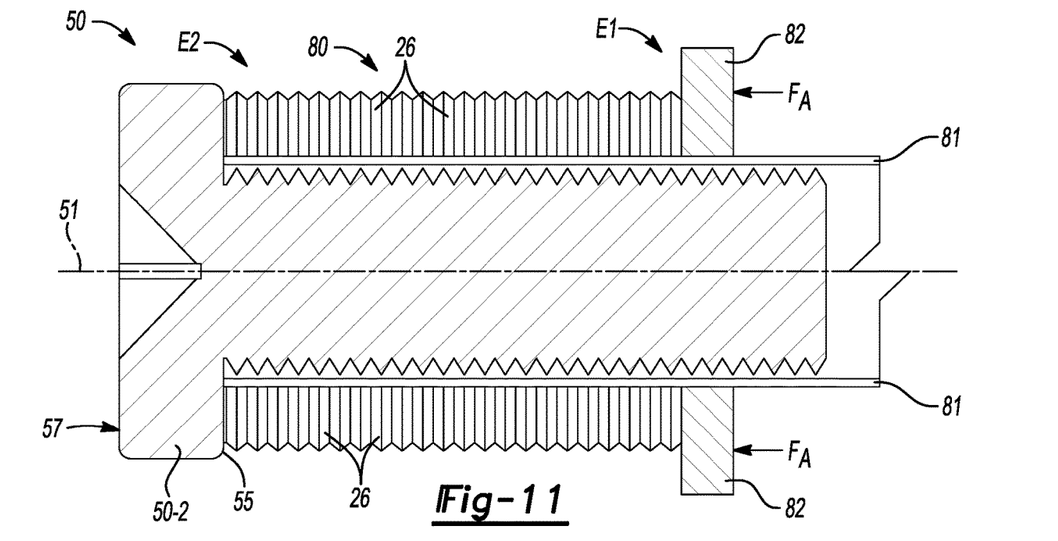
FIG. 11 is a schematic cross-sectional side view illustration of a representative stack of sacrificial RF tags configured for use in attachment to a fastener body in accordance with an aspect of the disclosure.
Figure 12:
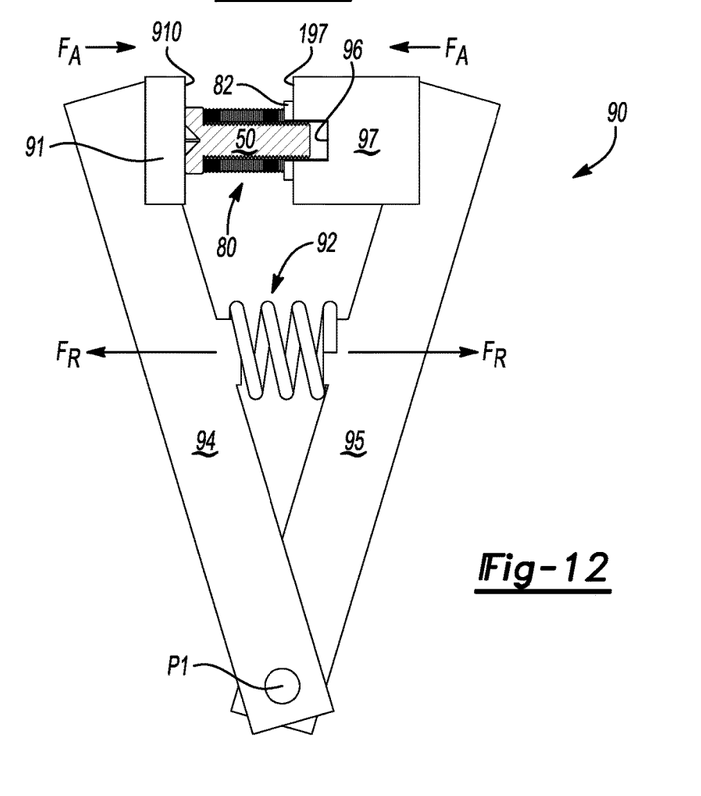
FIG. 12 is a schematic illustration of a representative clamping tool loaded with the stack of sacrificial RF tags shown in FIG. 12.

Referring now to FIGS. 11 and 12, attaching the sacrificial RF tag 26 to a given fastener body 50 optionally includes clamping the sacrificial RF tag 26 from a stack 80 onto the fastener body 50 using a clamping tool 90. To that end, the stack 80 of the representative annular sacrificial RF tags 26 of FIG. 3 may be situated on a spool 81, with the spool 81 circumscribed by a plunger 82 at a proximal end E1 of the stack 80. Such a stack 80 is then placed over the externally-threaded shaft 50-1 in the position of FIG. 11. An application force (arrows FA) is then applied to the plunger 82 to transmit the application force (arrow FA) to one of the sacrificial RF tags 26 disposed at a distal end E2 of the stack 80. The RF tag 26 at the distal end E2 is thereby adhered to the contact surface 55.

The clamping tool 90 shown in FIG. 12 may be used for this purpose. In the representative configuration, the clamping tool 90 includes a pair of spring-biased arms 94 and 95 connected at a pivot point P1 and biased by a return spring 92. The stack 80 of FIG. 11 may be inserted between an anvil 91 and an apply mechanism 97. In the illustrated embodiment of the clamping tool 90, an outer surface 57 of the fastener head 50-2 shown in FIG. 11 rests against a surface 910 of the anvil 91, with the plunger 82 likewise resting against a surface 197 of the apply mechanism 97. The apply mechanism 97 may define a pocket 96 within which the spool 81 of FIG. 11 is received and retained.

In order to attach one of the sacrificial RF tags 26 from the stack 80 to the fastener body 50, an operator would insert the fastener body 50 into the stack 80, which is prepositioned within the pocket 96. Thereafter, the operator would gently squeeze together distal ends (not shown) of the spring-biased arms 94 and 95 to compress the return spring 92. This compressing action in turn creates an apply force (arrows FA) that compresses the stack 80 between the surfaces 910 and 197. A sacrificial RF tag 26 located adjacent to the fastener head 50-2 of FIG. 11, with its adhesive material 40 facing the contact surface 55, is thus adhered to the contact surface 55. The next sacrificial RF tag 26 in the stack 80 of FIG. 11 is then in position to be applied to another fastener body 50 once the latter is inserted into the stack 80. When the operator releases pressure on the arms 94 and 95, the return spring 92 forces the arms 94 and 95 apart again via a return force (arrow FR).

Referring again to FIG. 10, once the sacrificial RF tag 26 has been adhered to the contact surface 55, the method next includes exciting the Rx receiver trace 234 at a predetermined interrogation frequency using the RF interrogation signal 30, which occurs by virtue of the RF tracking circuit 60 being brought into proximity of the sacrificial RF tag 260, i.e., of the above-described fastener accessory 70. The method also includes frequency-modulating the interrogation frequency using the RF modulating circuit 238 aboard the sacrificial RF tag 260, which as described above causes oscillation to occur at the predetermined response frequency. The method thereafter includes transmitting the RF response signal 130 at the predetermined response frequency via the Tx antenna trace 236. The RF response signal 130 is ultimately detected using an RF tracking device, e.g., the representative RF tracking circuit 60 of FIG. 10 or a similar setup, to thereby locate the fastener body 50 within the search area.

After detecting the RF response signal 130 in this manner, the method may include installing the fastener body 50, e.g., to the component 65 of FIG. 9. Such an action includes applying the installation force to the fastener body 50 to plastically destroy or plastically deform the sacrificial RF tag 26 to a level sufficient for preventing transmission of the RF response signal 130.

Those skilled in the art will appreciate that various other embodiments of the method may be envisioned for locating the fastener body 50 within a search area. For example, alternative methods may include adhering the sacrificial RF tag 26 to the fastener body 50 using the dielectric adhesive material 40 of FIG. 4A, with the sacrificial RF tag 26 containing the antenna array 32 of FIG. 2. Within the search area, the method may include exciting the Rx antenna trace 34 of the antenna array 32 after adhering the sacrificial RF tag 26 to the fastener body 50, including directing the calibrated RF interrogation signal 30 with its excitation or interrogation frequency from the RF tracking circuit 60 or another handheld RF tracking device into the search area.

After exciting the Rx antenna trace 34, the method may include receiving the RF response signal 130, with its predetermined response frequency, from the Tx antenna trace 36 using the handheld RF tracking circuit 60. Exemplary embodiments include transmitting the RF interrogation frequency 30 at a fixed frequency, e.g. 10 MHz, and receiving the RF response signal at a different frequency, e.g., 100 MHz. The method then proceeds by using the RF response signal 130 to locate the fastener body 50 within the search area, with the RF response signal 130 being characterized by an absence of data as noted above.

The method in this embodiment may include installing the fastener body 50 to a component of an aircraft or a spacecraft, e.g., the component 65 of FIG. 9, by applying the apply force to the fastener body 50. The apply force plastically deforms the sacrificial RF tag 26 to a level sufficient for preventing further transmission of the RF response signal 130. Adhering the sacrificial RF tag 26 to the fastener body using the dielectric adhesive material 40 as part of the method may include loading the stack 80 of the sacrificial RF tags 26, as shown in FIGS. 10 and 11, into the clamping tool 90 of FIG. 11. In a representative embodiment, the clamping tool 90 includes the anvil 91 and spring-biased arms 94 and 95, such that the method includes manually clamping the sacrificial RF tag 26 from the stack 80 directly onto the fastener body 50 using the clamping tool 90.

As will be appreciated by those skilled in the art in view of the foregoing disclosure, the sacrificial RF tag 26 in its various embodiments may be attached to relatively expensive fastener bodies 50, e.g., those constructed of titanium for aviation or aerospace uses, as well as to relatively inexpensive constructions such as aluminum and plastic. Likewise, the fastener bodies 50 may be of different configurations inclusive of rivets, threaded screws, nuts, and bolts, washers, and other small and easily dropped or misplaced fastener hardware.

The size and shape of the sacrificial RF tag 26 may likewise vary with the configuration of the fastener body 50 to which the sacrificial RF tags 26 are attached. Representative tag types and applications suitable for aviation use in non-limiting embodiments include planar annular/donut tags for use with any of the above fastener bodies 50, circular sleeve tags having an extended axial length to wrap around the externally-threaded shaft 50-1, line tags for use with rivet stems, ground straps, zip tie tails, etc., and beveled or conical angle tags for rivets, screws, conical washers, collars, and similar fastener bodies 50. Regardless of the size, shape, and materials of construction of the fastener body 50, instances of FOD may be greatly reduced using the above-described tracking solutions and associated hardware, with the sacrificial construction rendering the underlying sacrificial RF tag 26 inoperable, thus eliminating post-installation false alarms and errant signal transmission. These and other benefits will be readily appreciated by those skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A fastener accessory comprising:
   a fastener body having a contact surface configured to receive an installation force during connection of the fastener body to a component; and
   a sacrificial radio frequency (RF) tag having:
      a dielectric substrate affixed to the contact surface; and
      an RF antenna trace connected to or imprinted on the dielectric substrate, wherein the sacrificial RF tag is configured to transmit an RF response signal when excited via an RF interrogation signal by an external RF tracking circuit, and wherein the installation force is configured to plastically deform or destroy the sacrificial RF tag to prevent transmission of the RF response signal.

2. The fastener accessory of claim 1, wherein the RF antenna trace includes:
   a receiver (Rx) antenna trace positioned on or within the dielectric substrate;
   a transmitter (Tx) antenna trace spaced apart from the Rx antenna trace on or within the dielectric substrate; and
   an RF modulating circuit interconnecting the Rx antenna trace and the Tx antenna trace, wherein the sacrificial RF tag is configured to transmit the RF response signal at a predetermined response frequency, via the Tx antenna trace, when the Rx antenna trace is excited by the RF interrogation signal from the external RF tracking circuit.

3. The fastener accessory of claim 2, wherein the RF modulating circuit includes a fixed-value receiver.

4. The fastener accessory of claim 2, wherein the RF modulating circuit includes a system-on-a-chip configured to actively frequency-modulate a frequency of the RF interrogation signal to thereby generate the predetermined response frequency.

5. The fastener accessory of claim 1, wherein the fastener body includes an externally-threaded shaft and a fastener head that is integrally connected thereto at or along an underside of the fastener head.

6. The fastener accessory of claim 5, wherein the contact surface includes the underside of the fastener head.

7. The fastener accessory of claim 5, wherein the fastener body includes an internally-threaded nut configured to surround and engage the externally-threaded shaft during the installation, and wherein the contact surface includes a surface of the internally-threaded nut.

8. The fastener accessory of claim 1, wherein the dielectric substrate is constructed from a flexible polymer film.

9. The fastener accessory of claim 1, wherein a receiver (Rx) antenna trace and a transmitter (Tx) antenna trace are laser-etched, printed, or micro-imprinted directly onto the dielectric substrate.

10. The fastener accessory of claim 1, wherein the RF tag is non-serialized, such that the RF tag does not transmit data as part of the RF response signal.

* * * * *